United States Patent [19]
McKeown

[11] Patent Number: 5,826,852
[45] Date of Patent: Oct. 27, 1998

[54] BIRD FEEDER SUPPORT

[76] Inventor: Richard H. McKeown, 13 Benedita Ct., Moraga, Calif. 94556

[21] Appl. No.: 662,999

[22] Filed: Jun. 17, 1996

[51] Int. Cl.[6] .................................................. F16M 13/00
[52] U.S. Cl. ........................ 248/519; 248/520; 119/57.8; 411/552
[58] Field of Search ..................................... 248/519, 175, 248/511, 520, 158, 291.1, 292.13, 292.14; D30/114, 119, 125; 411/552, 553; 119/52.2, 52.3, 57.8, 57.9, 51.03

[56] References Cited

U.S. PATENT DOCUMENTS

| | | | |
|---|---|---|---|
| 417,997 | 12/1889 | Dupuis . | |
| 1,854,393 | 4/1932 | Berg . | |
| 2,662,717 | 12/1953 | Johnson | 248/292.13 |
| 2,975,999 | 3/1961 | Bunch | 248/121 |
| 4,044,983 | 8/1977 | Francis | 248/291.1 |
| 4,124,190 | 11/1978 | Wheeler | 248/538 |
| 4,767,088 | 8/1988 | Fieder et al. | 248/121 |
| 5,165,364 | 11/1992 | Horkey | 129/57.8 |
| 5,207,180 | 5/1993 | Graham | 119/52.3 |
| 5,313,910 | 5/1994 | Wittman | 119/57.9 |

*Primary Examiner*—Leslie A. Braun
*Assistant Examiner*—Kimberly T. Wood
*Attorney, Agent, or Firm*—Bielen, Peterson & Lampe

[57] ABSTRACT

A bird feeder support which is mounted to a surface including a base member. The base member possesses an open channel which is accessible from the outer surface of the base member. An arm having a first end portion, a second portion, and an intermediate portion connecting the first and second end portions, extends from the base member. The arm also possesses at least one flange which is capable of fitting within the channel. The arm is mounted to the base member to permit the flange to extend in one direction and to reverse its orientation within the channel to an opposite second direction. A bird feeder is easily fastened to the arm and is, thus, positioned in two orientations when the flange of the arm is rotated within the channel.

10 Claims, 2 Drawing Sheets

BIRD FEEDER SUPPORT

CROSS-REFERENCES TO RELATED APPLICATIONS

The present application is related to design patent application 29/016,062, filed Jan. 26, 1994.

BACKGROUND OF THE INVENTION

The present invention relates to a novel and useful surface mounted support for a bird feeder.

The feeding of wild birds has evolved into an extremely popular activity, ranking second only to gardening. Typically, bird feeding involves the mounting and replenishing of a bird feeder on or adjacent a house. Conventional bird feeders are constructed to be hung from a fixture or to be mounted directly to a surface. To properly operate a bird feeder, the bird seed must be available only to birds and bird droppings must not despoil the premises. To accomplish this objective, users have mounted bird feeders from trees, posts, and fences, generally a certain distance from a house. Unfortunately, such positioning makes it difficult to replenish the bird feeder easily.

In the past, support systems have been devised to hold items above a surface. For example, United States Pat. No. 417,997 describes holders that extend outwardly from a surface on an arm and are oriented by a rod that may be clamped in a certain position.

U.S. Pat. 5,207,180 shows a squirrel proof bird feeder that connects to an arm which extends outwardly from a support.

U.S. Pat. No. 5,165,364 illustrates a bird feeder apparatus connected to a wheel that rotates when the weight of a bird is applied to a tray structure attached thereto.

U.S. Pat. No. 4,767,088 shows a multi-station bird feeder support in which several bird feeders are attached to a central pole to allow the same to distribute the weight of the multiple bird feeders.

U.S. Pat. No. 5,313,910 describes a bird feeder support having a curved arm which extends outwardly from a bottom pin. Anti-squirrel structures are included in the arm just above a stem, which fit into a U-shaped bracket to lock the same against rotation.

A bird feeding support system which permits the user to hold a bird feeder in distinct positions for use in replenishment would be a notable advance in the housing and landscaping fields.

SUMMARY OF THE INVENTION

In accordance with the present invention a novel and useful support for surface mounting a bird feeder is herein provided.

The support of the present invention utilizes a base member which includes fastening means for fixing the base member to a surface. The surface may be a deck, a deck rail, a fence, and the like. Such fastening means may include the provision of a plurality of ears which extend from the base member and are capable accepting fasteners such as screws, bolts, nails, and the like. The base member further includes a channel which extends transversely along the upper surface of the base member.

The support of the present invention also is provided with an arm that possesses a first end portion, a second end portion, and an intermediate portion connecting the first and second end portions. At least one flange extends from the arm, preferably at the first end portion of the same. In certain cases, a pair of flanges extend from the first end portion of the arm generally along a line.

Mounting means is also found in the present invention for selectively holding the flange connected to the arm within the channel of the base member in a certain direction. Mounting means also provides reversal of the flange to another opposite direction, thus, permitting the arm to twist approximately 180 degrees from one position to another. In this regard, the arm may include a transverse extension through curvature or angulation of the arm. In this manner, the arm may be rotated from a position over a deck to another position over open space adjoining the deck, for example. The mounting means may be formed with a protuberance or stem extending from the arm that passes through a bore in the base member. A spring means biases the protuberance downwardly through the bore, but permits the arm to be lifted upwardly against the spring means to permit reversal of the flange of the arm within the channel. Thus, the support of the present invention provides a stable and easily reversible platform for operation of a bird feeder. Fastening means is also included in the present invention for easily connecting a bird feeder to the arm, normally at the second end portion thereof.

It may be apparent that a novel and useful surface mounted support for a bird feeder has been described hereinabove.

It is therefore an object of the present invention to provide a support for a bird feeder which positions the bird feeder in a multiplicity of positions at the predilection of the user.

Another object of the present invention is to provide a support for a bird feeder which is sturdy and durable for outdoor use.

Another object of the present invention is to provide a support for a bird feeder which eliminates the spoilation associated with bird droppings found in a bird feeding station.

A further object of the present invention is to provide a support for a bird feeder which is simple and easy to install and manipulate from a first position to an opposite second position.

The invention possesses other objects and advantages especially as concerns particular characteristics and features thereof which will become apparent as the specification continues.

Figure 1:
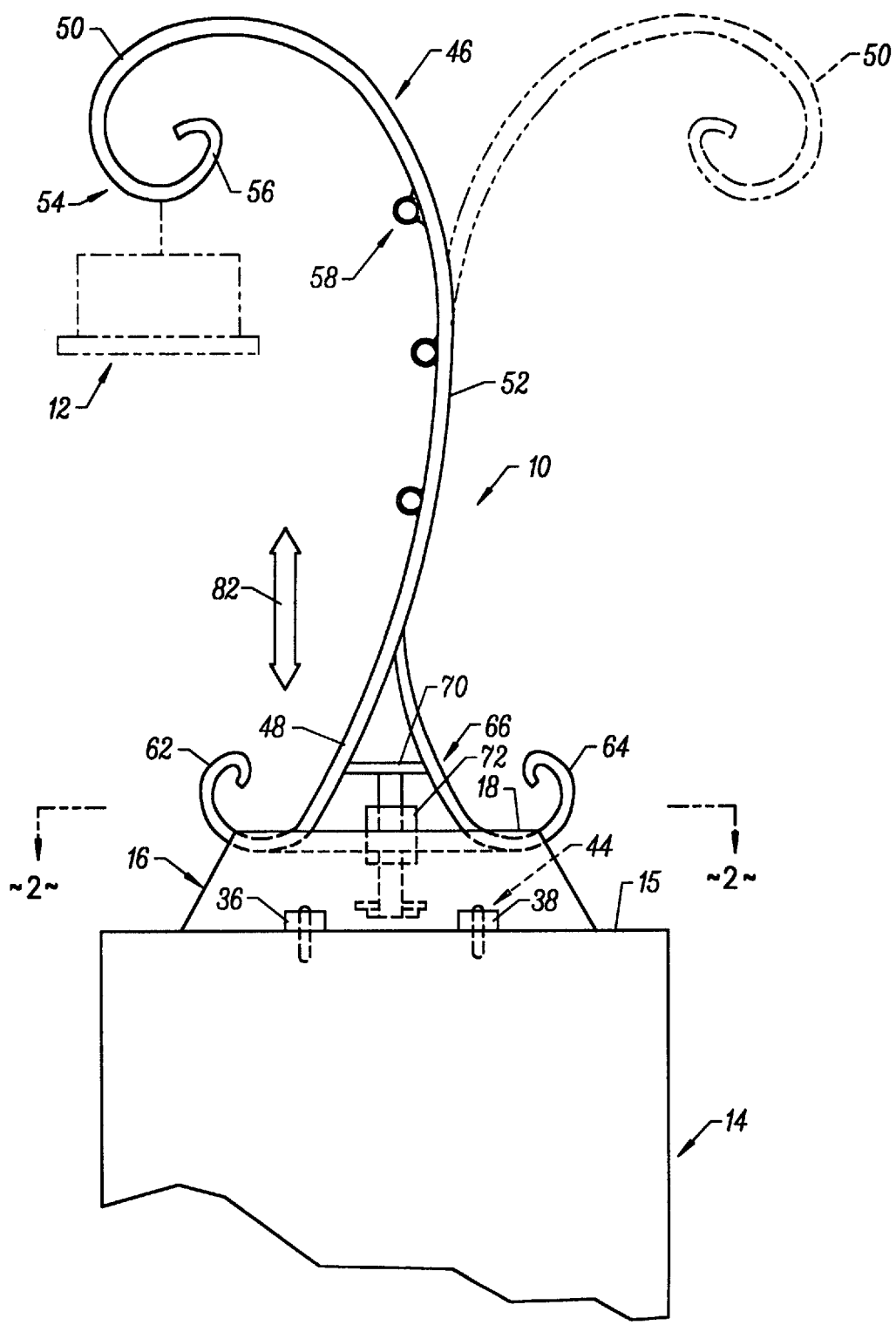
FIG. 1 is a side elevational view of the support of the present invention in place on a surface, the reversal of the position of the arm being depicted in phantom.

For a better understanding of the invention reference is made to the following detailed description of the preferred embodiments thereof which should be taken in conjunction with the hereinabove described drawings.

DETAILED DESCRIPTION OF THE PREFERRED EMBODIMENTS

Various aspects of the present invention will evolve from the following detailed description of the preferred embodiments thereof which should be taken in conjunction with the hereinabove described drawings.

The invention as a whole is shown in the drawings by reference character 10. Support 10 is intended to hold a bird feeder 12 in position above a structure 14 which may be a rail, a fence, a deck, and the like. Support 10 possesses a surface 15 to which support 10 is mounted.

Figure 2:
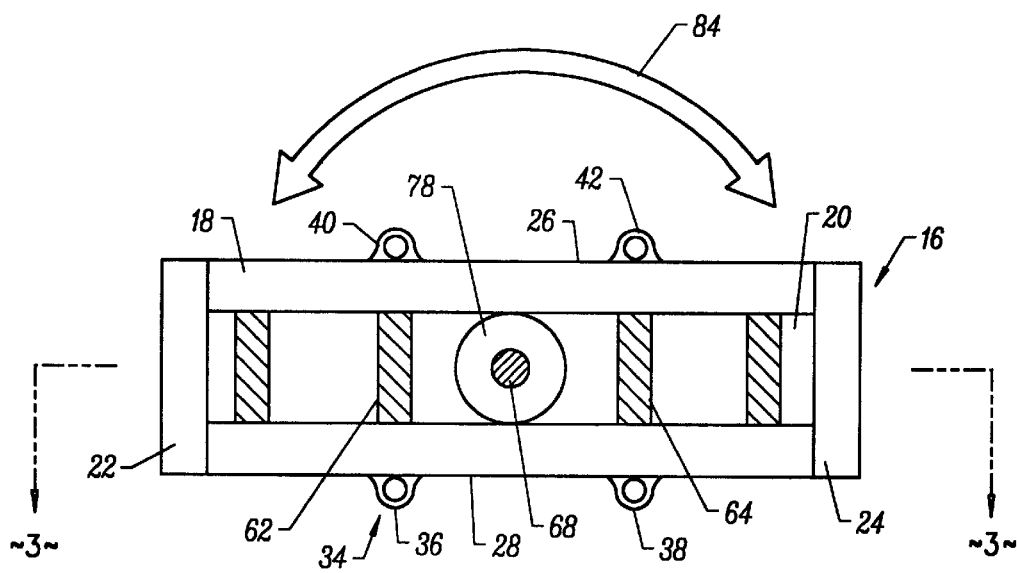
FIG. 2 is a sectional view taken along line 2—2 of FIG. 1.
Figure 4:
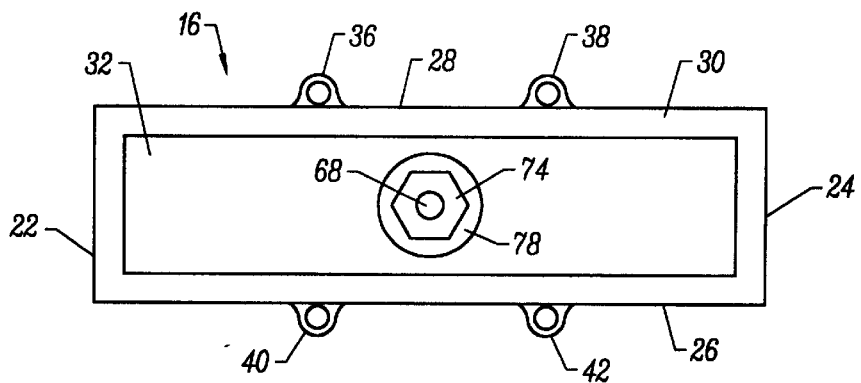
FIG. 4 is a bottom plan view of the base member of the present invention.

Support 10 includes as one of its elements a base member 16, best shown in FIGS. 2 and 4. Base member is formed out of any rigid or semi-rigid material such metal wood, plastic, and the like. Upper surface 18 of base member 16 is provided with a channel 20 which extends completely along top portion 18 and meets sloping end surfaces 22 and 24. Side surfaces 26 and 28 may be straight or sloped. Bottom edge 30 of base member 16, FIG. 4, extends endlessly around member 16 and surrounds a hollow open cavity 32 within base member 16. Fastening means 34 fixes base member 16 to surface 15 of structure 14. Apertured ears 36, 38, 40, and 42 show a typical embodiment of fastening means 34. Plurality of fasteners 44, FIG. 1, may take the form of screws, bolts, nails, and the like, which pass through the apertured ears 36, 38, 40, and 42 to firmly fasten base member 16 to surface 15 of structure 14.

Support 10 also is formed with an arm 46. Arm 46 includes a first end portion 48, a second end portion 50, and an intermediate portion 52, which connects first end portion 48 to second end portion 50 thereof. Holding means 54 in the shape of an open loop 56 permits the user to connect and disconnect bird feeder 12 from arm 46. Normally, bird feeder 12 would also include a hook or clip in this regard. Plurality of bars 58 are welded or otherwise fastened to intermediate portion 52 of arm 46 to permit birds to perch on arm 46. Arm 46 assumes a curved configuration, but may extend laterally relative to base member 16 through angulation.

Flanges 62 and 64 form the termini of first end portion 48 of arm 46. Flanges 62 and 64 are also formed into open loops, in the embodiment shown, only for the sake of aesthetics. Arm 46 is constructed of a material similar to base member 16, such as wrought iron.

Figure 3:
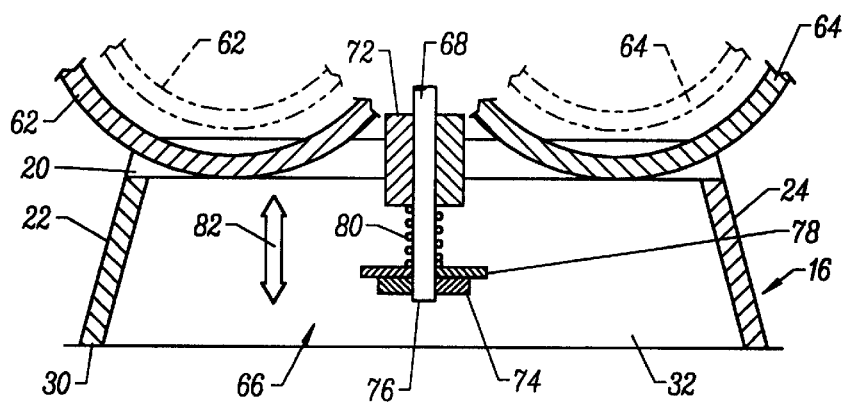
FIG. 3 is a sectional view taken along line 3—3 of FIG. 2.

Mounting means 66 is also provided in the present invention for selectively holding flanges 62 and 64 within channel 20 of base member 16 in a certain direction. Mounting means 66 also permits the reversal of flanges 62 and 64, when arm 46 is twisted 180 degrees. FIG. 1 shows arm 46 as curving outwardly from the center portion of base member 16 in either of two directions. End portion 50 extends transversely relative to the central portion of base member 16 when flanges 62 and 64 lie within channel 20. FIGS. 2–4 further detail mounting means 66 in which a protuberance or threaded stem 68 extends downwardly from cross-brace 70, which is welded or otherwise fixed to flanges 62 or 64. Likewise, threaded protuberance 68 is welded to brace 70. With reference to FIG. 3, it may be observed that a bushing 72 is fixed within channel 20 and extends from the top or upper surface 18 of base member 16 to open cavity 32. Threaded stem 68 is capable of passing through bushing 72. Nut 74 engages threaded end portions 76 of threaded stem 68. Washer 78 is positioned above nut 74 and holds spring 80 between washer 78 and bushing 72. Thus, spring 80 forces stem 68 and arm 46 downwardly. However, the user is also able to move arm 46 upwardly against the downward pressure asserted by spring 80. Also, directional arrow 82 indicates this dual motion of stem 68 and arm 46.

In operation, the user fastens bird feeder 12 to second end portion 50, specifically, open loop 56 of arm 46. Flanges 62 and 64 locate within channel 20 of base member 16. Stem 68 extends through bushing 72 and is held in place by spring 80 between bushing 72 and washer 78. Such mounting means 66 permits the user to reverse the orientation of arm 46, as depicted in FIG. 1 in phantom. For example, the user may grasp arm 46 and pull the same upwardly to release flanges 62 and 64 from channel 20, at which time arm 46 may be rotated according to directional arrow 84, FIG. 2. End portion 50 of arm 46 would then be oriented 180 degrees from its prior position. FIG. 3 represents the movement of flanges 62 and 64 from channel 20 in an upward direction in order to permit the same to clear the edge of channel 20. The position of arm 46 depicted in solid line on FIG. 1 would permit the user to refill bird feeder 12, for example. Reversal of the position of arm 46 and end portion 50 thereof to that shown in phantom lines on FIG. 1 would allow birds to feed without bird droppings falling on a deck or other structure from which the refilling took place.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A surface mounted support for a bird feeder comprising:
   a. a base member, said base member including fastening means for fixing said base member to said surface, said base member further comprising a open channel;
   b. an arm, said arm including a first end portion, a second end portion, and an intermediate portion connecting said first end portion to said second end portion; said arm first end portion including at least one flange extending in a certain direction;
   c. mounting means for selectively holding said flange in said open channel in one direction and another opposite direction to support said arm, said intermediate portion and said second end portion extending outwardly from said base member, said mounting means permitting lifting of said flange from said open channel and reentry of said flange into said open channel to selectively hold said flange in said open channel in one direction and another opposite direction; and
   d. holding means for connecting said bird feeder to said arm when said flange lies in said open channel in one direction or in said another opposite direction.

2. The support of claim 1 in which arm second end portion further extends transversely relative to said base member.

3. The support of claim 2 in which said arm intermediate portion curves.

4. The support of claim 1 in which said arm first end portion includes a pair of flanges, each of said pair of flanges fitting within said base member channel.

5. The support of claim 1 in which said mounting means further includes a protuberance extending from said arm, said base member possessing a bore, said protuberance extending through said bore, and spring means for urging said protuberance through said bore.

6. The support of claim 5 in which said spring means includes a bushing on said protuberance and a spring bearing on said protuberance.

7. The support of claim 1 in which said fastening means comprising said base member including a multiplicity of ears and a plurality of fasteners connecting said ears to the surface.

8. The support of claim 7 in which said mounting means further includes a protuberance extending from said arm, said base member possessing a bore, said protuberance extending through said bore, and spring means for urging said protuberance through said bore.

9. The support of claim 8 in which said spring means includes a bushing on said protuberance and a spring bearing on said protuberance.

10. The support of claim 1 in which said fastening means comprises a plurality of fasteners engaging said base member.

\* \* \* \* \*